United States Patent
Gstoettenbauer

(10) Patent No.: US 10,536,168 B2
(45) Date of Patent: Jan. 14, 2020

(54) PROGRAM FLOW MONITORING FOR DETERMINISTIC FIRMWARE FUNCTIONS

(71) Applicant: Infineon Technologies AG, Neubiberg (DE)

(72) Inventor: Bernhard Gstoettenbauer, Engerwitzdorf (AT)

(73) Assignee: Infineon Technologies AG, Neubiberg (DE)

( * ) Notice: Subject to any disclaimer, the term of this patent is extended or adjusted under 35 U.S.C. 154(b) by 232 days.

(21) Appl. No.: 15/344,926

(22) Filed: Nov. 7, 2016

(65) Prior Publication Data

US 2018/0131387 A1    May 10, 2018

(51) Int. Cl.
| | |
|---|---|
| H03M 13/00 | (2006.01) |
| H03M 13/09 | (2006.01) |
| G06F 9/30 | (2018.01) |
| G06F 21/00 | (2013.01) |
| G06F 9/38 | (2018.01) |
| G11B 20/18 | (2006.01) |

(52) U.S. Cl.
CPC ........ H03M 13/09 (2013.01); G06F 9/30021 (2013.01); H03M 13/6569 (2013.01); G06F 9/3861 (2013.01); G06F 21/00 (2013.01); G11B 2020/1843 (2013.01)

(58) Field of Classification Search
CPC .... G06F 9/30021; G06F 21/00; G06F 9/3861; G06F 11/30; H03M 13/09; H03M 13/6569; G11B 2020/1843
USPC ................................. 714/704, 705, 758, 807
See application file for complete search history.

(56) References Cited

U.S. PATENT DOCUMENTS

| | | | | |
|---|---|---|---|---|
| 5,974,529 | A * | 10/1999 | Zumkehr | .............. G06F 9/3005 712/239 |
| 9,323,920 | B2 | 4/2016 | Wenzel | |
| 2004/0015747 | A1* | 1/2004 | Dwyer | ...................... G06F 8/54 714/47.1 |

(Continued)

OTHER PUBLICATIONS

Understanding and Using Cyclic Redundancy Checks with Maxim 1-Wire and iButton Products. https://www.maximintegrated.com/en/app-notes/index.mvp/id/27. 15 pages.

(Continued)

*Primary Examiner* — Albert Decady
*Assistant Examiner* — Osman M Alshack
(74) *Attorney, Agent, or Firm* — Eschweiler & Potashnik, LLC

(57) ABSTRACT

The present disclosure relates to a safety system having a memory unit configured to store a series of executable instructions. In some embodiments, the executable instructions are grouped into code parts, and each code part is assigned a predefined code value. A processor is configured to execute the series of executable instructions, and to output the predefined code values respectively as the code parts are executed. A program flow monitoring (PFM) unit is configured to respectively receive the predefined code values from the processor, such that the PFM unit generates an error-checking value from the predefined code values. A verification unit is configured to compare the error-checking value to an expected return value to determine whether the series of executable instructions executed properly.

20 Claims, 6 Drawing Sheets

(56) References Cited

U.S. PATENT DOCUMENTS

| | | | |
|---|---|---|---|
| 2008/0120492 A1* | 5/2008 | Dye | G06F 9/3005 |
| | | | 712/225 |
| 2009/0089644 A1* | 4/2009 | Mead | H03M 13/09 |
| | | | 714/758 |
| 2010/0192052 A1* | 7/2010 | Jiang | G06F 11/0739 |
| | | | 714/807 |
| 2011/0184716 A1* | 7/2011 | Mangold | G06F 11/3612 |
| | | | 703/22 |
| 2011/0307758 A1* | 12/2011 | Fillingim | G06F 11/1048 |
| | | | 714/758 |
| 2012/0246452 A1 | 9/2012 | Gammel et al. | |
| 2012/0272104 A1* | 10/2012 | Jacobi | F02D 41/22 |
| | | | 714/47.1 |
| 2013/0019231 A1 | 1/2013 | Mangard et al. | |
| 2013/0145219 A1* | 6/2013 | Dalal | G06F 11/302 |
| | | | 714/47.1 |
| 2015/0331745 A1* | 11/2015 | Zastrow | G06F 11/1048 |
| | | | 714/764 |

OTHER PUBLICATIONS

Nahmsuk Oh et al.; "Control-Flow Checking by Software Signatures"; IEEE Transactions on Reliability; vol. 51, No. 2; Mar. 2002. pp. 111-122.

* cited by examiner

PROGRAM FLOW MONITORING FOR DETERMINISTIC FIRMWARE FUNCTIONS

FIELD

The present disclosure relates to systems and methods for program flow monitoring of functions using code values.

BACKGROUND

Processors are designed to execute programs comprised of instructions. When a program is executed, it is expected that the instructions are executed in an intended sequence. However, in some situations, the sequence with which the instructions are executed may deviate from the intended sequence. Such deviations may be caused by, for example, hardware errors, electromagnetic radiation, or malicious interference. For some applications, it's sufficient that the instructions execute according to the intended sequence most of the time. However, for certain other applications, it's important that the instructions always execute according to the intended sequence. For example, in some automotive object-detection systems, such as radar, it's important that the instructions always execute according to the intended sequence.

Some automotive radar systems are employed to ensure the safety of drivers and passengers by, for example, providing blind spot monitoring and/or automatic breaking. Due to the safety importance of such automotive radar systems, safety monitoring units and safety controllers may be employed to monitor devices or components of the automotive radar systems. The safety monitoring units are hardware devices configured to perform tests on the devices or components. For example, a safety monitoring unit may be configured to input a radio frequency (RF) signal into a receive chain and to compare an output of the receive chain to an expected output. The safety controllers are programmable devices comprising memory configured to store programs, as well as, processors configured to execute the programs to trigger the tests and, in some embodiments, evaluate results of the test. As such, it's important that instructions of the programs are executed in the intended sequences.

One approach for reducing the likelihood of program instructions being executed out of sequence is to design the processors to higher standards. For example, whereas processors in the automotive industry are often designed to meet the quality management standard of ISO 16949, the processors may be designed to meet the higher safety standard of ISO 26262. However, designing the processors to meet higher standards is challenging and costly given the complexity of the processors.

SUMMARY

The present disclosure provides systems and methods for program flow monitoring using code values. As a processor executes a set of instructions, the processor fetches the instructions from a memory. The instructions include code parts and code values. For example, the instructions may comprise a first code part, a first code value, a second code part, and a second code value. As each code part is respectively executed by a processor, the processor outputs each respective code value to a program flow monitoring (PFM) unit. The PFM unit receives the respective code values and generates an error-checking value based on a sequence in which the respective code values were input into the PFM unit. For example, the error-checking value may be generated by a cyclic redundancy check (CRC). After executing the instructions, the error-checking value is compared to an expected return value to determine whether the instructions were executed in the intended sequence. If the error-checking value matches the expected return value, there is a high likelihood that the instructions were executed in the intended sequence. Otherwise, warnings may be flagged and/or corrective measures may be taken.

In some embodiments, the PFM unit is implemented in hardware and is independent of the processor. In some of such embodiments, the PFM unit is designed and/or developed according to a more demanding standard than the processor. For example, the processor may be designed and/or developed according to a quality management standard, such as ISO 16949, whereas the PFM unit may be designed and/or developed according to a higher standard, such as ISO 26262.

Further, in some embodiments, the PFM unit is employed within a safety system configured to monitor a device or component, such as, for example, a device or component of an automotive radar system. In some of such embodiments, the safety system comprises a safety monitoring unit, a safety controller, the PFM unit, and a verification unit. The safety monitoring unit is a hardware device configured to perform a test on the monitored device or component. The safety controller is a programmable device comprising a memory configured to store a set of instructions, as well as a processor configured to execute the instructions to trigger the test and, in some embodiments, evaluate a result of the test. In some embodiments, before executing the instructions, the controller is configured to reset the PFM unit. The verification unit is a hardware device or software configured to verify that an error-checking value generated by the PFM unit matches an expected return value.

DETAILED DESCRIPTION

The following detailed description makes reference to the accompanying drawings which constitute a part of the disclosure and in which, for purposes of illustration, special example embodiments are shown, whereby the disclosure can be practically realized. It is understood that other example embodiments may be employed, and that structural and other changes may be implemented, without going beyond the scope of protection of the present disclosure. Thus, the following detailed description should not be regarded as being limitative. Rather, the scope of protection of the present disclosure is defined only by the accompanying patent claims.

Figure 1:
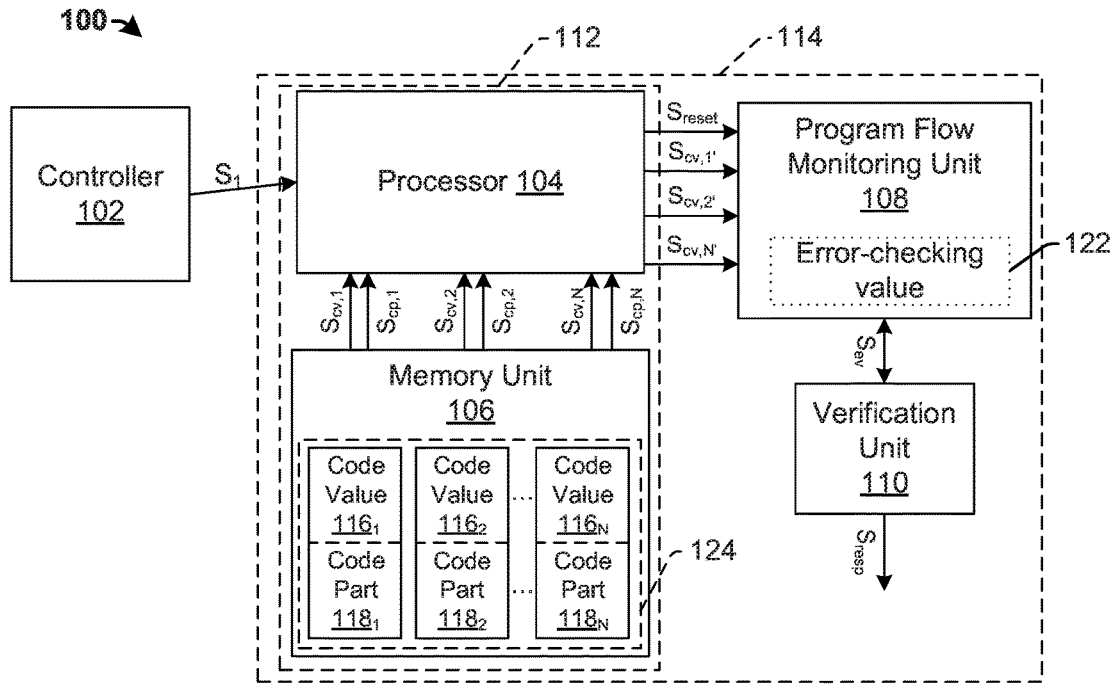
FIG. 1 illustrates a block diagram of some embodiments of a programmable system using code values for program flow monitoring.

FIG. 1 is a block diagram 100 of some embodiments of a programmable system using code values for program flow monitoring (PFM). As illustrated, a memory unit 106 is configured to store a series of instructions 124. The series of instructions 124 may comprise a plurality of code parts $118_1$, $118_2$, $118_N$, and a plurality of respective code values $116_1$, $116_2$, $116_N$. For example, a first code part $118_1$ may be associated with a first code value $116_1$. The series of instructions 124 is a set of instructions that are configured for execution in a predefined sequence to carry out a task or function. Further, the code parts $118_1$, $118_2$, $118_N$ may be a program, a function of a program, or a segment of a function or program. Also, the code values $116_1$, $116_2$, $116_N$ may be a predefined value of M bits, wherein M is an integer greater than or equal to 1. For example, the code values $116_1$, $116_2$, $116_N$ may be pseudo-randomly generated numbers comprising M bits. The code values may be independent of the code parts in that they are not derived from the code parts. The memory unit 106 may be, for example, a read-only memory (ROM) device and/or a flash memory device or other non-volatile memory device(s).

A processor 104 is configured to execute the series of instructions 124 by fetching and executing the series of instructions 124 from the memory unit 106 in a predefined sequence. For example, the processor 104 is configured to fetch a first code value $116_1$ via a first code value signal $S_{cv,1}$ from the memory unit 106, and fetch a first code part $118_1$ via a first code part signal $S_{cp,1}$ from the memory unit 106. The processor outputs the first code value $116_1$ via a first prime code value signal $S_{cv,1'}$, and executes the first code part $118_1$. In some embodiments, the processor is configured to output a reset signal $S_{reset}$ prior to outputting the first code value $116_1$ via a first prime code value signal $S_{cv,1'}$. In some embodiments, the processor 104 begins the execution of the series of instructions 124 in response to a signal $S_1$ from a controller 102. The controller 102 may be so configured that it meets requirements for safe operation. For example, the controller 102 may be trusted and/or meet a high safety standard, such as ISO 26262.

Next, the processor fetches a second code value $116_2$ via a second code value signal $S_{cv,2}$ from the memory unit 106, and fetches a second code part $118_2$ via a second code part signal $S_{cp,2}$ from the memory unit 106. The processor outputs the second code value $116_2$ via a second prime code value signal $S_{cv,2'}$, and executes the second code part $118_2$. The processor 104 continues this fetching, outputting, and executing until an Nth code value $116_N$ is fetched via an Nth code value signal $S_{cv,N}$ from the memory unit 106, and an Nth code part $118_N$ is fetched via an Nth code part signal $S_{cp,N}$ from the memory unit 106. The processor outputs the Nth code value $116_N$ via an Nth prime code value signal $S_{cp,N'}$, and executes the Nth code part $118_N$. The processor 104 may be, for example, a microprocessor, and/or may be, for example, integrated with the memory unit 106 in a microcontroller 112.

While the processor 104 ideally executes the series of instructions 124 according to a predefined sequence, there may be deviations between the executed sequence and the predefined sequence. Such deviations may be caused by, for example, hardware errors, electromagnetic radiation, or malicious interference. Therefore, a PFM unit 108 is configured to respectively receive the code values $116_1$, $116_2$, $116_N$ via their respective prime code value signals $S_{cv,1'}$, $S_{cv,2'}$, $S_{cv,N'}$, and generate an error-checking value 122 based on the code values $116_1$, $116_2$, $116_N$. For example, the error-checking value 122 may be generated by a cyclic redundancy check (CRC). In some embodiments, the error-checking value 122 is generated with L bits, whereas the code values $116_1$, $116_2$, $116_N$ each comprise M bits. L and M are integer values greater than zero and may, for example, be the same or different. For example, L may be 16, whereas M may be 32. Further, in some embodiments, the PFM unit 108 first receives the first code value $116_1$. In some embodiments, the PFM unit 108 is reset via a reset signal $S_{reset}$ prior to receiving the first code value $116_1$. Next, the PFM unit 108 receives the second code value $116_2$. The PFM unit 108 continues receiving code values until the PFM unit 108 receives the Nth code value $116_N$. Once the Nth code value $116_N$ is received, the PFM generates the error-checking value 122. In some embodiments, the PFM unit 108 outputs the error-checking value 122 via an error-checking value signal $S_{ev}$.

A verification unit 110 is configured to receive the error-checking value 122 via the error-checking signal $S_{ev}$, and to compare the error-checking value 122 to an expected return value to determine if the series of instructions 124 were executed properly. If the error-checking value 122 matches the expected return value, there is a high likelihood that the series of instructions 124 were executed in the predefined sequence. In contrast, if the error-checking value 122 does not match the expected return value, there is a high likelihood that the series of instructions 124 were not executed in accordance with the predefined sequence. In some embodiments, the verification unit 110 further tracks the length of time it takes for the series of executable instructions 124 to complete, and compares the actual run time to an expected or maximum time internal. If the series of executable instructions 124 took longer to run than the expected or maximum time internal, an error may be triggered.

In some embodiments, the foregoing is repeated for one or more additional series of instructions 124. Each series of instructions 124 has a corresponding expected return value. For example, a first series of instruction $124_1$ has a corresponding first expected return value, and a second series of instructions $124_2$ has a corresponding second expected return value, which may or may not be different than the first expected return value. Further, each series of instructions 124 may comprise N number of checkpoints, wherein N is an integer greater than or equal to 1. For example, the first series of instructions $124_1$ may comprise, for example, six checkpoints. The second series of instructions $124_2$ may comprise, for example, eleven checkpoints. In some embodiments, the PFM unit 108, the verification unit 110, and the controller 102 may be programmed to monitor the individual checkpoints of each series of instructions 124.

The expected return value may be a predefined value for each series of instructions 124 and stored in non-volatile memory, such as, for example, a ROM device and/or a flash memory device. For example, a manufacturer may program a first expected return value for a first series of instructions $124_1$ and a second expected return value for a second series of instructions $124_2$, which may or may not be different from the first expected return value. In some embodiments, the expected return value is defined (e.g., by the manufacturer)

independently of the code values $116_1$, $116_2$, $116_N$. In some of such embodiments, at least one, but not all, of the code values $116_1$, $116_2$, $116_N$ is/are randomly generated, and the one or more remaining code values is/are selected so the error-checking value 122 from the PFM unit 108 matches the expected return value. For example, the first N-1 code values $116_1$, $116_2$, $116_{N-1}$ may be randomly generated, and the Nth code value $116_N$ may be selected so the error-checking value 122 from the PFM unit 108 matches the expected return value. In some other embodiments, the expected return value is defined (e.g., by the manufacture) based on the code values $116_1$, $116_2$, $116_N$. For example, the code values $116_1$, $116_2$, $116_N$ may be randomly generated, and the expected return value may be calculated from the code values $116_1$, $116_2$, $116_N$.

After comparing the error-checking value 122 to the expected return value, the verification unit 110 may output a response signal $S_{resp}$. An appropriate response/action may be taken based on the response signal $S_{resp}$. For example, if the response signal $S_{resp}$ indicates the error-checking value 122 did not match the expected return value, warnings may be flagged and/or corrective measures may be taken. The processor 104, memory unit 106, PFM unit 108, and the verification unit 110 may be, for example, integrated together on an integrated chip 114. Further, in some embodiments, rather than the processor 104 transmitting the code values $116_1$, $116_2$, $116_N$ to the PFM unit 108, a direct memory access (DMA) block can transfer the code values $116_1$, $116_2$, $116_N$ to the PFM unit 108 under the direction of the processor 104.

In some embodiments, some of the units and/or circuits in FIG. 1 can be implemented in hardware, while other units of FIG. 1 can be implemented in software, firmware, etc. For example, in some embodiments, the PFM unit 108, verification unit 110, processor 104, and memory unit 106 may be hardware integrated together on a single integrated circuit (IC), while the controller 102 may be hardware integrated on a separate IC. In other embodiments, the PFM unit 108 and/or the verification unit 110 may be implemented as instructions stored in semiconductor memory and executed on a processor, such as a microprocessor, microcontroller, baseband processor, or digital signal processor. In still other embodiments, all components can be integrated on a single monolithic IC, or in a three dimensional packaged IC made up of multiple dies stacked over one another in an IC package.

Figure 2:
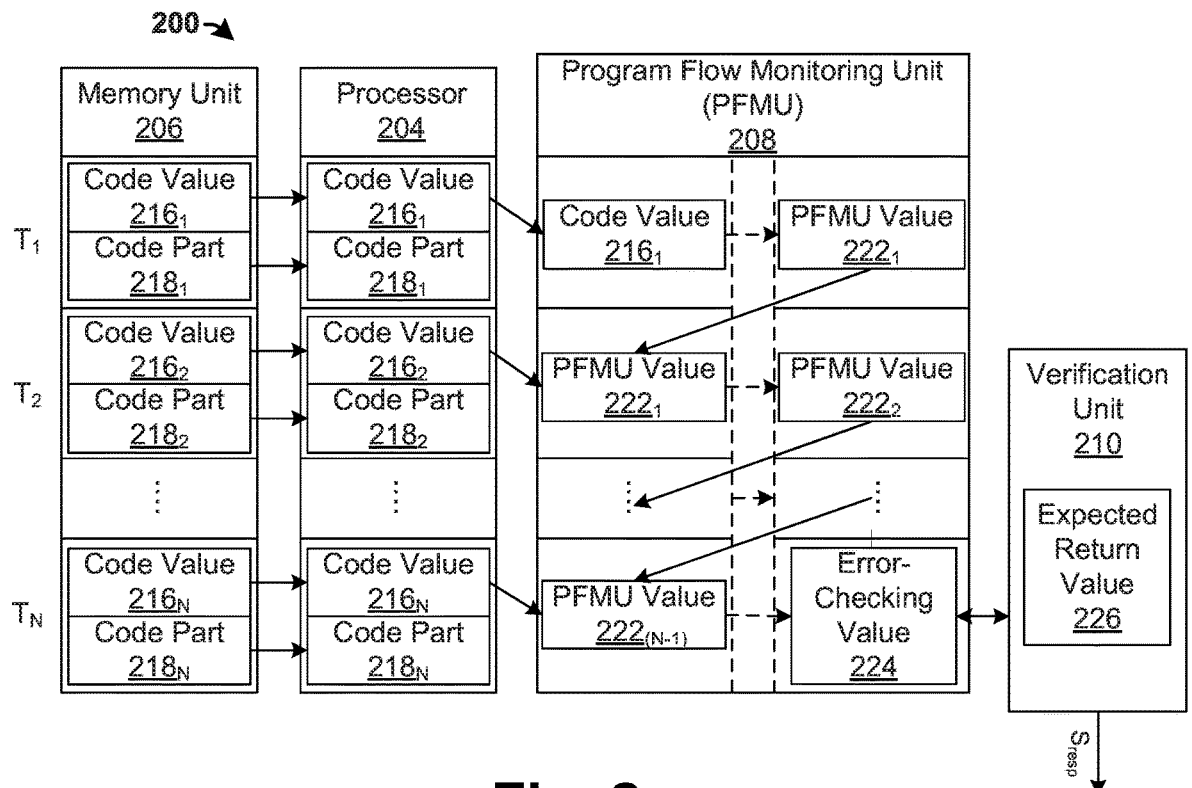
FIG. 2 illustrates a block diagram of some more detailed embodiments of a programmable system executing a series of instructions, generating an error-checking value, and comparing the error-checking value to an expected return value.

FIG. 2 is a block diagram 200 of some more detailed embodiments of the programmable system executing a series of instructions, generating an error-checking value, and comparing the error-checking value to an expected return value. As illustrated, a memory unit 206 is configured to store a plurality of code values $216_1$, $216_2$, $216_N$ and a plurality of respective code parts $218_1$, $218_2$, $218_N$. The code parts $218_1$, $218_2$, $218_N$ may be a program, a function of a program, or a segment of a function or program. Also, the code values $216_1$, $216_2$, $216_N$ may be a predefined value of M bits, wherein M is an integer greater than or equal to 1. In some embodiments, at least one, but not all, of the code values $216_1$, $216_2$, $216_N$ are pseudo-randomly generated numbers comprising M bits, and the one or more remaining code values (e.g., code value $216_2$) are defined in such a manner that if program flow monitoring (PFM) unit 208 receives the code values $216_1$, $216_2$, $216_N$ in a predefined sequence, the PFM unit 208 will generate an error-checking value 224 that matches the expected return value 226. For example, in order to generate an expected return value 226, at least one code value $216_1$, $216_2$, $216_N$ cannot be randomly chosen. In contrast, if the PFM unit 208 receives the code values $216_1$, $216_2$, $216_N$ in a sequence that deviates from the predefined sequence, the PFM unit 208 will generate an error-checking value 224 that does not match the expected return value 226.

In some embodiments, at a first time interval $T_1$, a processor 204 fetches a first code value $216_1$ and a first code part $218_1$. After fetching the first code value $216_1$ and the first code part $218_1$, the processor outputs the first code value $216_1$ to the PFM unit 208 and executes the first code part $218_1$. After receiving the first code value $216_1$, the PFM unit 208 generates a first PFMU value $222_1$ that is based on the input of the first code value $216_1$ into the PFM unit 208.

In some embodiments, at a second time interval $T_2$, the processor 204 fetches a second code value $216_2$ and a second code part $218_2$. After fetching the second code value $216_2$ and the second code part $218_2$, the processor outputs the second code value $216_2$ to the PFM unit 208 and executes the second code part $218_2$. After receiving the second code value $216_2$, the PFM unit 208 generates a second PFMU value $222_2$ that is based on the first PFMU value $222_1$ and the input of the second code value $216_2$ into the PFM unit 208.

In some embodiments, at an Nth time interval $T_N$, the processor 204 fetches an Nth code value $216_N$ and an Nth code part $218_N$. After fetching the Nth code value $216_N$ and the Nth code part $218_N$, the processor outputs the Nth code value $216_N$ to the PFM unit 208 and executes the Nth code part $218_N$. After receiving the Nth code value $216_N$, the PFM unit 208 generates an error-checking value 224 that is based on the most recently generated PFMU value, for example PFMU value $222_{(N-1)}$, and the input of the Nth code value $216_N$ into the PFM unit 208.

In some embodiments, the verification unit 210 fetches the error-checking value from the PFM unit 224, and compares the error-checking value with an expected return value 226. For example, if the error-checking value 224 matches the expected return value 226, there is a high likelihood that the plurality of code parts $218_1$, $218_2$, $218_N$ were executed in a predefined sequence. In contrast, if the error-checking value 224 does not match the expected return value 226, there is a high likelihood that the plurality of code parts $218_1$, $218_2$, $218_N$ were not executed in the predefined sequence. In some embodiments, after comparing the error-checking value 224 to the expected return value 226, the verification unit 210 outputs a response signal $S_{resp}$. An appropriate response/action may be taken based on the response signal $S_{resp}$. For example, if the response signal $S_{resp}$ indicates the error-checking value 224 did not match the expected return value, warnings may be triggered and/or corrective measures may be taken. In some embodiments, the plurality of code values $216_1$, $216_2$, $216_N$, the plurality of generated PFMU values $222_1$, $222_2$, $222_N$, the error-checking value 224, and the expected return value 226 may comprise M bits.

Figure 3:
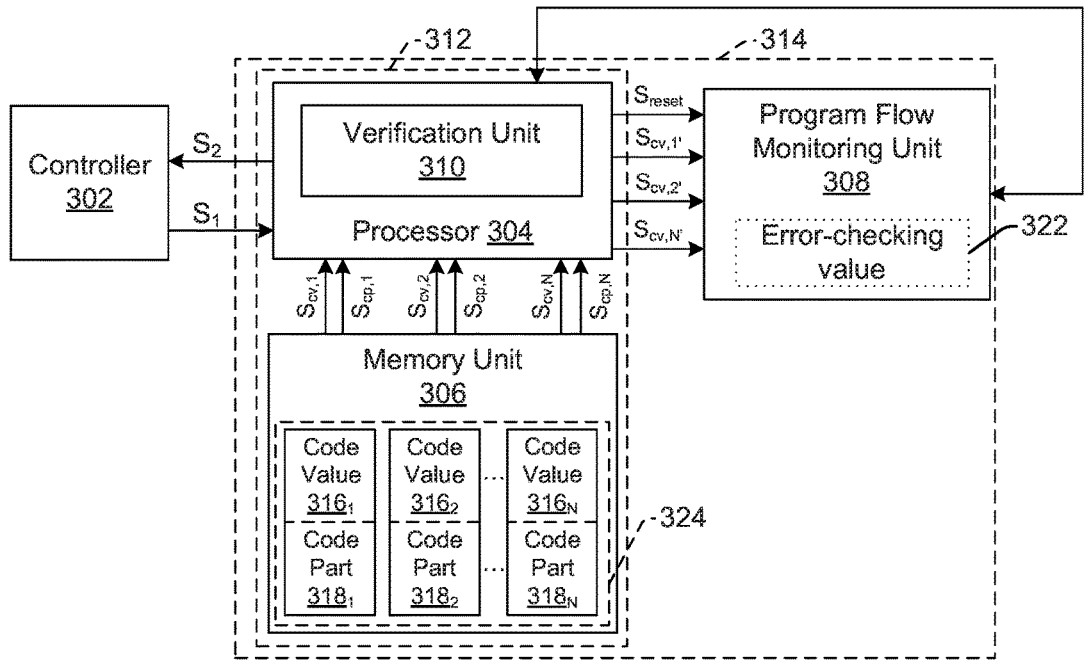
FIG. 3 illustrates a block diagram of some variations of some embodiments of the programmable system of FIG. 1.

FIG. 3 is a block diagram 300 of some variations of some embodiments of the programmable system of FIG. 1. As illustrated, a processor 304 is configured to implement a verification unit 310 through software. For example, the processor is provided an error-checking value 322 that was generated by a program flow monitoring (PFM) unit 308. The processor 304 compares the error-checking value 322 to an expected return value to determine if the series of instructions 324 were executed in a predefined sequence. For example, if the error-checking value 322 matches the expected return value, there is a high likelihood that the series of instructions 324 were executed in a predefined sequence. In contrast, if the error-checking value 322 does not match the expected return value, there is a high likelihood that the series of instructions 324 were not executed in the predefined sequence. In some embodiments, after comparing the error-checking value 322 to the expected return value, the processor 304 outputs a response signal $S_2$ to a controller 302. An appropriate response/action may be taken based on the response signal $S_2$. For example, if the response signal $S_2$ indicates the error-checking value 322 did not match the expected return value, the controller 302 may take corrective measures and/or warnings may be taken. Although FIG. 3 depicts the controller 302 receiving the response signal $S_2$ and taking appropriate action, it should be appreciated that the processor 304 may take appropriate actions and may output the response signal $S_2$ anywhere in the system.

Figure 4:
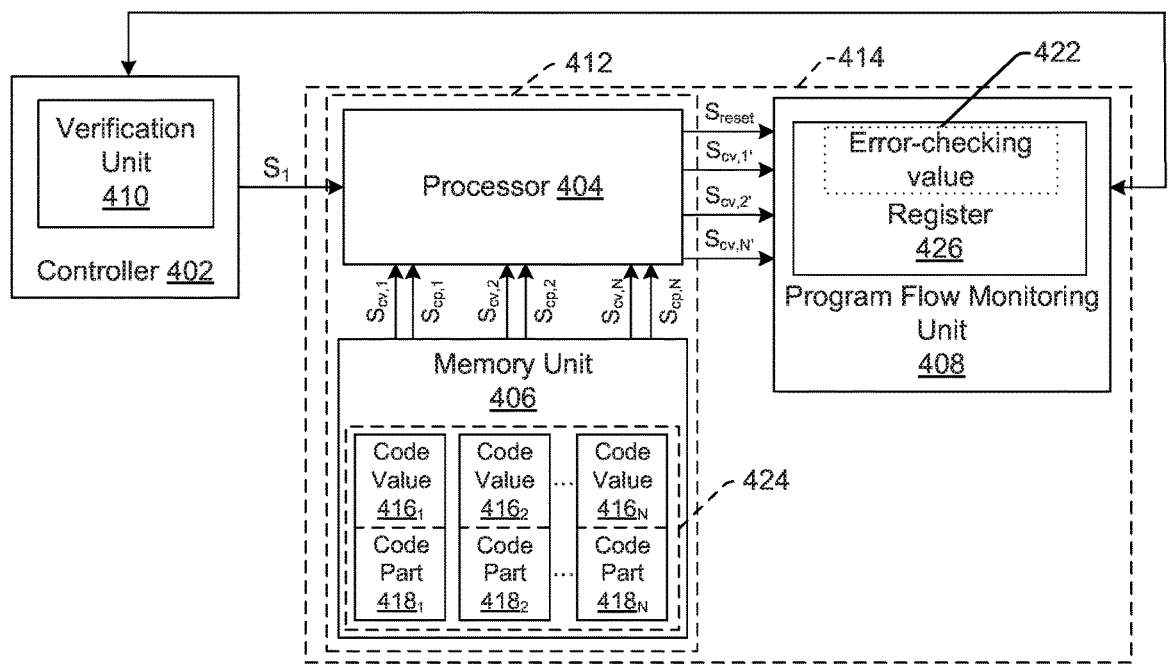
FIG. 4 illustrates a block diagram of some variations of some embodiments of the programmable system of FIG. 1.

FIG. 4 is a block diagram 400 of some variations of some embodiments of the programmable system of FIG. 1. As illustrated, a controller 402 is configured to read a register 426 that was provided an error-checking value 422 from a program flow monitoring (PFM) unit 408. For example, the PFM unit generates an error-checking value 422 based on the input sequence of a plurality of code values $416_1$, $416_2$, $416_N$. While generating the error-checking value 422, the PFM unit 408 provides the error-checking value to the register 426. The register 426 stores the error-checking value 422. In some embodiments, the controller 402 is provided the error-checking value 422 by reading the register 426. The controller 402 then compares the error-checking value 422 to an expected return value to determine if the series of instructions 424 were executed in a predefined sequence. For example, if the error-checking value 422 matches the expected return value, there is a high likelihood that the series of instructions 424 were executed in the predefined sequence. In contrast, if the error-checking value 422 does not match the expected return value, there is a high likelihood that the series of instructions 424 were not executed in the predefined sequence. In some embodiments, the controller 402 may take corrective measures and/or warnings may be taken.

Figure 5:
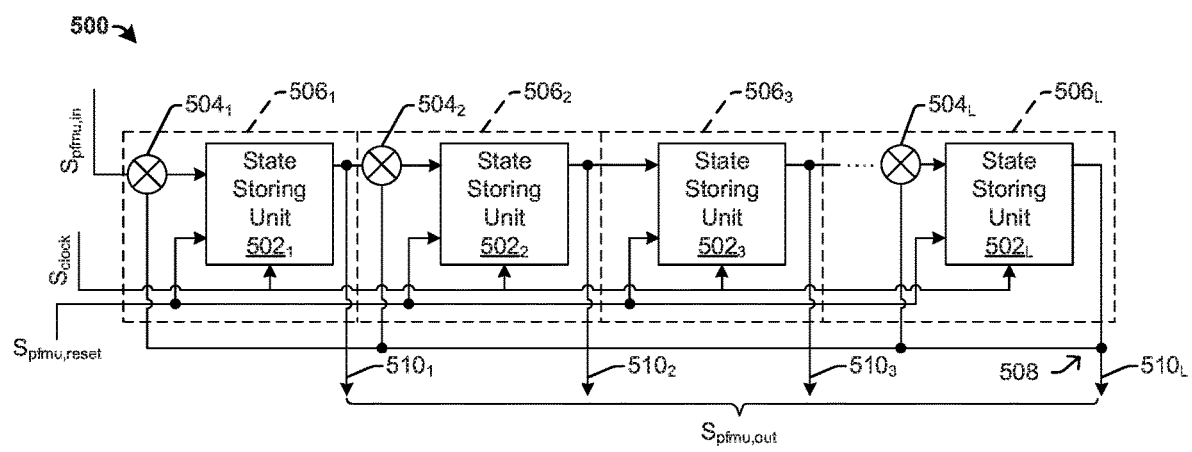
FIG. 5 illustrates a block diagram of some more detailed embodiments of a program flow monitoring (PFM) unit.

FIG. 5 is a block diagram 500 of some more detailed embodiments of a program flow monitoring (PFM) unit. It is to be understood that this is just an example of the PFM unit and that other embodiments of the PFM unit are amenable.

As illustrated, the program flow monitoring (PFM) unit comprises a plurality of stages $506_1$, $506_2$, $506_3$, $506_L$ connected in series, however in other embodiments the plurality of stages $506_1$, $506_2$, $506_3$, $506_L$ may be connected in parallel. In some embodiments, each stage $506_1$, $506_2$, $506_3$, $506_L$ comprises a respective state storing unit $502_1$, $502_2$, $502_3$, $502_L$, for example, a flip-flop or a latch. In various embodiments, a stage $506_1$, $506_2$, $506_3$, $506_L$ may additionally comprise a logic gate $504_1$, $504_2$, $504_L$ for example, a XOR gate, NAND gate, AND gate, OR gate, etc. In some embodiments, the stages $506_1$-$506_L$ may all be identical to one another, but more often at least some of the stages $506_1$-$506_L$ are different—for example in FIG. 5 the third stage $506_3$ lacks a logic gate $504_1$, $504_2$ as is present in the first and second stages $506_1$, $506_2$, respectively. The first stage $506_1$ is configured to receive a PFMU input signal $S_{pfmu,in}$, a clock signal $S_{clock}$, and a PFMU reset signal $S_{pfmu,reset}$. The PFM unit 500 may be configured to output a concatenated series of bits that are output from each stage $506_1$, $506_2$, $506_3$, $506_L$ to generate a PFMU output signal $S_{pfmu,out}$. In some embodiments, the PFMU output signal $S_{pfmu,out}$ is the error-checking value. A feedback path 508 couples an output of the Lth stage back to an input of each stage $506_1$, $506_2$, $506_3$, $506_L$ that comprises a gate $504_1$, $504_2$, $504_L$.

For example, the PFM unit 500 may be configured to receive an M-bit string of data from a processor via the PFMU input signal $S_{pfmu,in}$ over a given time interval, and generate a single L-bit error-checking value that will be transmitted via the PFMU output signal $S_{pfmu,out}$ at the end of the time interval, wherein M and L are integers greater than or equal to 1. In some embodiments, a PFMU reset signal $S_{pfmu,reset}$ is provided to the PFM unit 500 to reset each state storing unit $502_1$, $502_2$, $502_3$, $502_L$ before receiving a first bit of the string of M-bits. After receiving the PFMU reset signal $S_{pfmu,reset}$, a first stage $506_1$ receives a first bit of the M-bit string of data in a first clock cycle. The first stage $506_1$ then XORs the first bit with an Lth stage output value $510_L$ provided by the Lth stage $506_L$ from the feedback path 508. Based on timing parameters of the state storing units $502_1$, $502_2$, $502_3$, $502_L$, for example, rising-edge or falling-edge, and the frequency of the clock signal $S_{check}$, for example, 2.4 GHz, the first stage $506_1$ will provide a first stage output value $510_1$ to the second stage $506_2$ in a second clock cycle.

The second stage $506_2$ may comprise a second gate $504_2$ and/or a second state storing unit $502_2$. During the second clock cycle, the second stage $506_2$ receives the first stage output value $510_1$, and XORs the first stage output value $510_1$ with the Lth stage output value $510_L$ in the second clock cycle. Based on timing parameters of the state storing units $502_1$, $502_2$, $502_3$, $502_L$ and the frequency of the clock signal $S_{clock}$, the second stage $506_2$ will provide a second stage output value $510_2$ to a third stage $506_3$ in the next clock cycle. The third stage $506_3$ and additional stages up to an Lth stage $506_L$ process an output value of the previous stage (and optionally the bit provided by the Lth stage $506_L$ and/or other values) to provide their respective output values.

The PFM unit 500 will continue to receive bits of data from the M-bit string of data in successive clock cycles until all bits have been processed. At the end of the time interval during which the M-bit string of data is received, an L-bit output value $S_{pfmu,out}$ is delivered. The L-bit output value is a concatenation of the first stage output value $510_1$, second stage output value $510_2$, third stage output value $510_3$, ..., and Lth stage output value $510_L$ at the end of the time interval. In some embodiments, this $S_{pfmu,out}$ value at the end of the time interval is stored in a register, latched, or otherwise retained. In some embodiments, after the first stage $506_1$ receives the Mth bit of the M-bit string of data, the processor provides a second M-bit string of data via the PFMU input signal $S_{pfmu,in}$, and this second M-bit string of data is used to generate a second $S_{pfmu,out}$ signal in similar fashion. For example, a predefined number of separate M-bit strings of data may be provided to the PFM unit. The PFM unit will continue to receive and process each individual bit of data until the first stage $506_1$ receives the Mth bit of the final predefined M-bit string of data.

In some embodiments, a verification unit is provided an error-checking value comprising L-bits via the PFMU output signal $S_{pfmu,out}$. The verification unit may compare the error-checking value to an expected return value. If the error-checking value matches the expected return value, there is a high likelihood that the PFM unit received the multiple strings of M-bits of data in the predefined sequence. In contrast, if the error-checking value does not match the expected return value, there is a high likelihood that the PFM unit did not receive the multiple strings of M-bits of data in the predefined sequence.

In some embodiments, some of the units and/or circuits in FIG. 5 can be implemented in hardware, while other units of FIG. 5 can be implemented in software, firmware, etc. For example, in some embodiments, the stages $506_1$, $506_2$, $506_3$, $506_L$ may be comprised of hardware devices integrated on an integrated circuit (IC). In other embodiments, the stages $506_1$, $506_2$, $506_3$, $506_L$ may be implemented as instructions stored in semiconductor memory and executed on a processor, such as a microprocessor, microcontroller, baseband processor, or digital signal processor. In still other embodiments, all components can be integrated on a single monolithic IC, or in a three dimensional packaged IC made up of multiple dies stacked over one another in an IC package.

Figure 6:
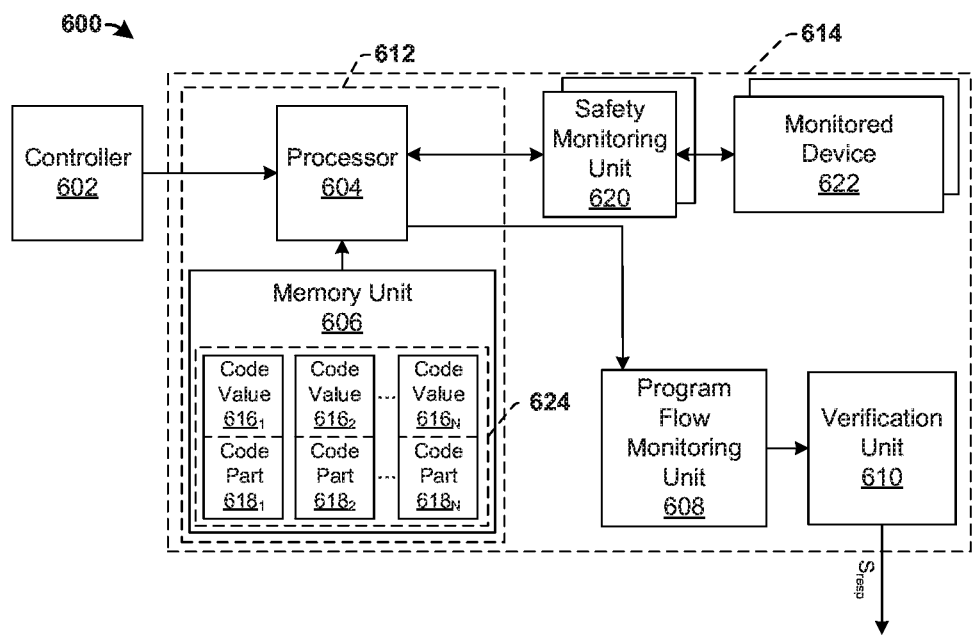
FIG. 6 illustrates a block diagram of some embodiments of an object-detection system in which the program flow monitoring system of FIG. 1 may be disposed.

FIG. 6 is a block diagram 600 of some embodiments of an object-detection system in which the program flow monitoring system of FIGS. 1, 3, and/or 4 may find application. As illustrated, one or more safety monitoring units 620 are respectively configured to perform tests on one or more monitored devices 622 by executing a series of instructions 624. For example, a safety monitoring unit 620 may be configured to input a radio frequency (RF) signal into a receive chain of an object-detection system and to compare an output of the receive chain to an expected output. Further, the safety monitoring unit(s) 620 are hardware devices, as opposed to software, and, in some embodiments, are designed to a safety standard, for example, ISO 26262.

In some embodiments, a processor 604 is configured to fetch and execute code parts $618_1$, $618_2$, $618_N$ in a predefined sequence that are configured to perform a test on a monitored device(s) 622 by a safety monitoring unit(s) 620. Further, the processor 604 is configured to fetch the respective code values $616_1$, $616_2$, $616_N$ that correspond with their respective code parts $618_1$, $618_2$, $618_N$, and output the respective code values $616_1$, $616_2$, $616_N$ in a predefined sequence to a program flow monitoring (PFM) unit 608. For example, the processor 604 fetches a first code value $616_1$ and a first code part $618_1$. In addition, the processor outputs the first code part $618_1$ to the PFM unit 608, and executes the first code part $618_1$ configured to perform a test on the monitored device(s) 622 by the safety monitoring unit(s) 620. The processor continues this fetching, outputting, and executing until an Nth code value $616_N$ and an Nth code part $618_N$ are fetched from the memory unit 606. The processor outputs the Nth code value $616_N$ to the PFM unit 608, and executes the Nth code value $618_N$ configured to perform a test on the monitored device(s) 622 by the safety monitoring unit(s) 620. The processor 604 may be, for example, a microprocessor, and/or may be, for example, integrated with the memory unit 606 in a microcontroller 612.

While the processor 604 ideally executes the code parts $618_1$, $618_2$, $618_N$ according to the predefined sequence, there may be deviations between the executed sequence and the predefined sequence. Therefore, the PFM unit 608 is configured to receive the code values $616_1$, $616_2$, $616_N$ as their respective code parts $618_1$, $618_2$, $618_N$ are executed, and generate an error-checking value that is based on the input sequence of the code values $616_1$, $616_2$, $616_N$.

In some embodiments, a verification unit 610 is configured to fetch the error-checking value generated by the PFM unit 608 and compare the error-checking value to an expected return value. If the error-checking value matches the expected return value, there is a high likelihood that the series of instructions 624 were executed in the predefined sequence. In contrast, if the error-checking value does not match the predefined expected return value, there is a high likelihood that the series of instructions 624 were not executed in the predefined sequence. After comparing the error-checking value to the predefined expected return value, the verification unit 610 may output a response signal $S_{resp}$. An appropriate response/action may be taken based on the response signal $S_{resp}$. For example, if the response signal $S_{resp}$ indicates the error-checking value did not match the expected return value, warnings may be flagged and/or corrective measures may be taken. The processor 604, memory unit 606, PFM unit 608, safety monitoring unit(s) 620, monitored device(s) 622, and the verification unit 610 may be, for example, integrated together on an integrated chip 614.

Figure 7:
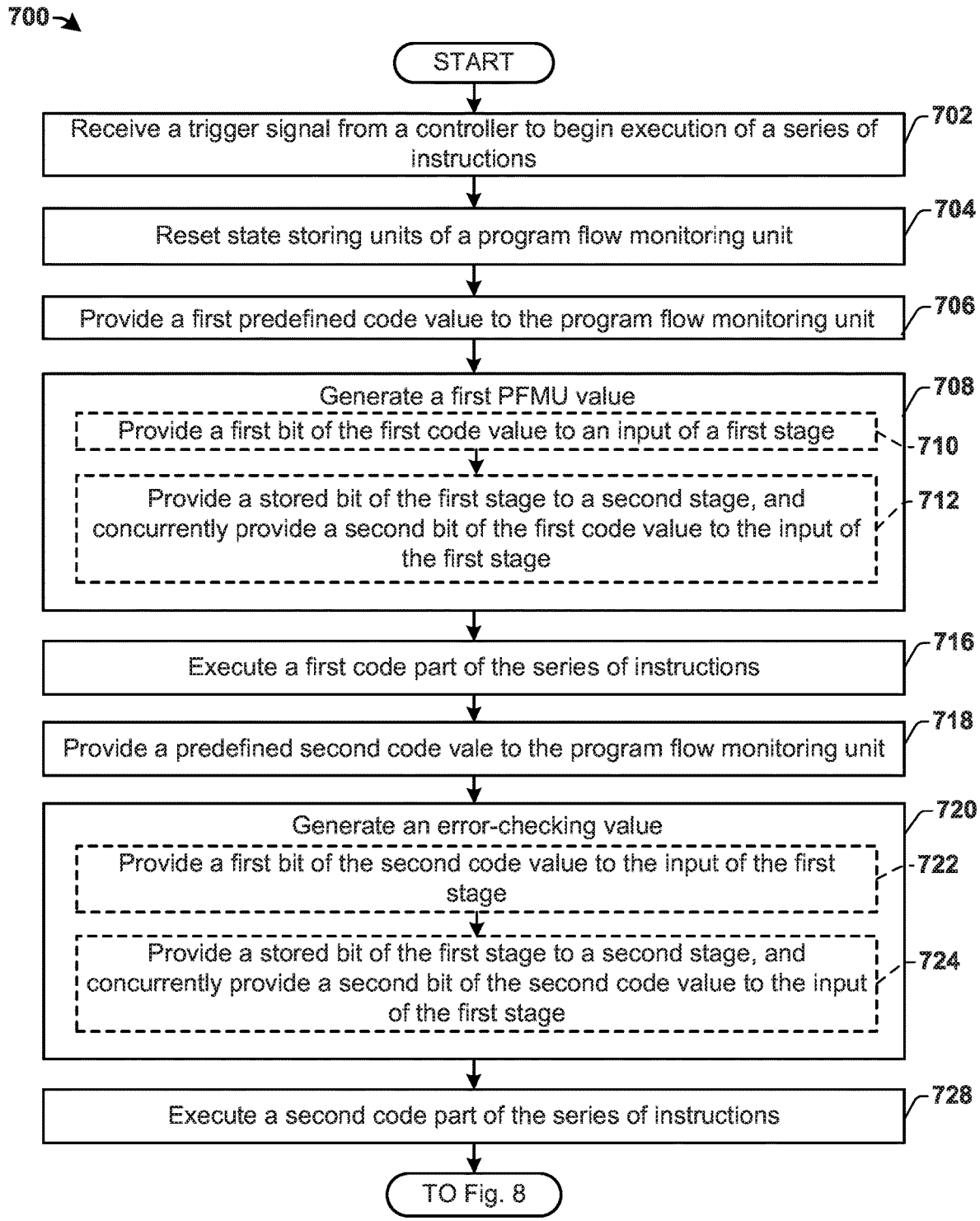
FIG. 7 illustrates a first part of a flow diagram of some embodiments of a method for generating an output signal that signals an error-checking value either matched or did not match an expected return value.

FIG. 7 is a first part of a flow diagram of some embodiments of a method 700 for generating an output signal that signals an error-checking value either matched or did not match an expected return value.

It will be appreciated that while method 700 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts or events may be required to implement one or more aspects or embodiments disclosure herein. Also, one or more of the acts depicted herein may be carried out in one or more separate acts and/or phases.

At 702, in some embodiments, a trigger signal is received from a controller to begin execution of a series of instructions. The signal may be received by a processor. In some embodiments, the processor may be, for example, a microprocessor, and/or may be, for example, integrated with a memory unit in a microcontroller.

At 704, in some embodiments, state storing units of a program flow monitoring (PFM) unit are reset. The state storing units are reset by a reset signal. The processor may provide the reset signal to the PFM unit. In some embodiments, the reset signal may be provided by the controller. The reset signal may be, for example, an edge-triggered signal, a state-driven signal, or an inverse logic signal.

At 706, in some embodiments, a first predefined code value is provided to the PFM unit. The processor may provide the first predefined code value to the PFM unit. For example, the processor may fetch a first predefined code value from a memory unit and provide the first predefined code value to the PFM unit.

At 708, in some embodiments, a first PFMU value is generated. The PFMU value is generated by the PFM unit. As illustrated in 710, the PFMU value is generated by providing a first bit of data of the first code value to a first stage of the PFM unit. The first stage comprises a first state storing unit, which may, for example, store a XOR between the first bit and an output of a last stage of the PFM unit. As illustrated in 712, after the first bit of data of the first code value is provided to the first stage, a stored bit of the first stage is provided to a second stage of the PFM unit. The second stage comprises a second state storing unit, which may, for example, store a XOR between the stored bit and the output of the last stage of the PFM unit. Further, concurrently therewith, a second bit of data of the first code value is provided to the first stage, and the first state storing unit may, for example, store a XOR between the second bit and the output of the last stage. This process of shifting and XORing bits of data to a subsequent stage may be continued until an Mth bit of data of the first code value is provided to the first stage, wherein M is an integer greater than or equal to 1. In other embodiments, the bits of data may be input into the state storing units in a parallel manner.

At 716, in some embodiments, a first code part of the series of instructions is executed. In some embodiments, the processor executes the first code part by fetching the first code part from a memory unit. By executing the first code part, the processor may configure and/or trigger one or more safety monitoring unit(s) to perform a test on one or more monitored hardware device(s). In other embodiments, the processor performs the test on a monitored hardware device.

At 718, in some embodiments, a second predefined code value is provided to the PFM unit. The processor may provide the second predefined code value to the PFM unit. For example, the processor may fetch a second predefined code value from a memory unit and provide the second predefined code value to the PFM unit.

At 720, in some embodiments, an error-checking value is generated. The error-checking value is based on the first PFMU value stored in the PFM unit, which is an amalgamation of outputs of the state storing units. The error-checking value is generated in a similar manner as to the PFMU value. As illustrated in 722, the error-checking value is generated by providing a first bit of data of a second code value to the first stage of the PFM unit, where the first state storing unit may, for example, store a XOR between the first bit and an output of a last stage of the PFM unit. As illustrated in 724, after the first bit of data of the second code value is received by the first state storing unit, the first bit of data of the second code value is provided to the second state storing unit. As illustrated in 726, after the first bit of data of the second code value is provided to the first stage, a stored bit of the first stage is provided to the second stage of the PFM unit, where the second state storing unit may, for example, store a XOR between the stored bit and the output of the last stage of the PFM unit. Further, concurrently therewith, a second bit of data of the second code value is provided to the first stage, and the first state storing unit may, for example, store a XOR between the second bit and the output of the last stage. This process of shifting and XORing bits of data to a subsequent state storing device may be continued until an Mth bit of data of the second code value is provided to the first state storing device, wherein M is an integer greater than or equal to 1. Further, in some embodiments, an N−1 number of PFMU values may be generated prior to the error-checking value being generated. In other embodiments, the bits of data may be input into the state storing units in a parallel manner.

At 728, in some embodiments, a second code part of the series of instructions is executed. The processor may execute the second code part by fetching the second code part from a memory unit, and provide the fetched code part to a safety monitoring unit(s) which are configured to perform a test on a monitored hardware device(s). In other embodiments, the processor performs the test on a monitored hardware device.

Figure 8:
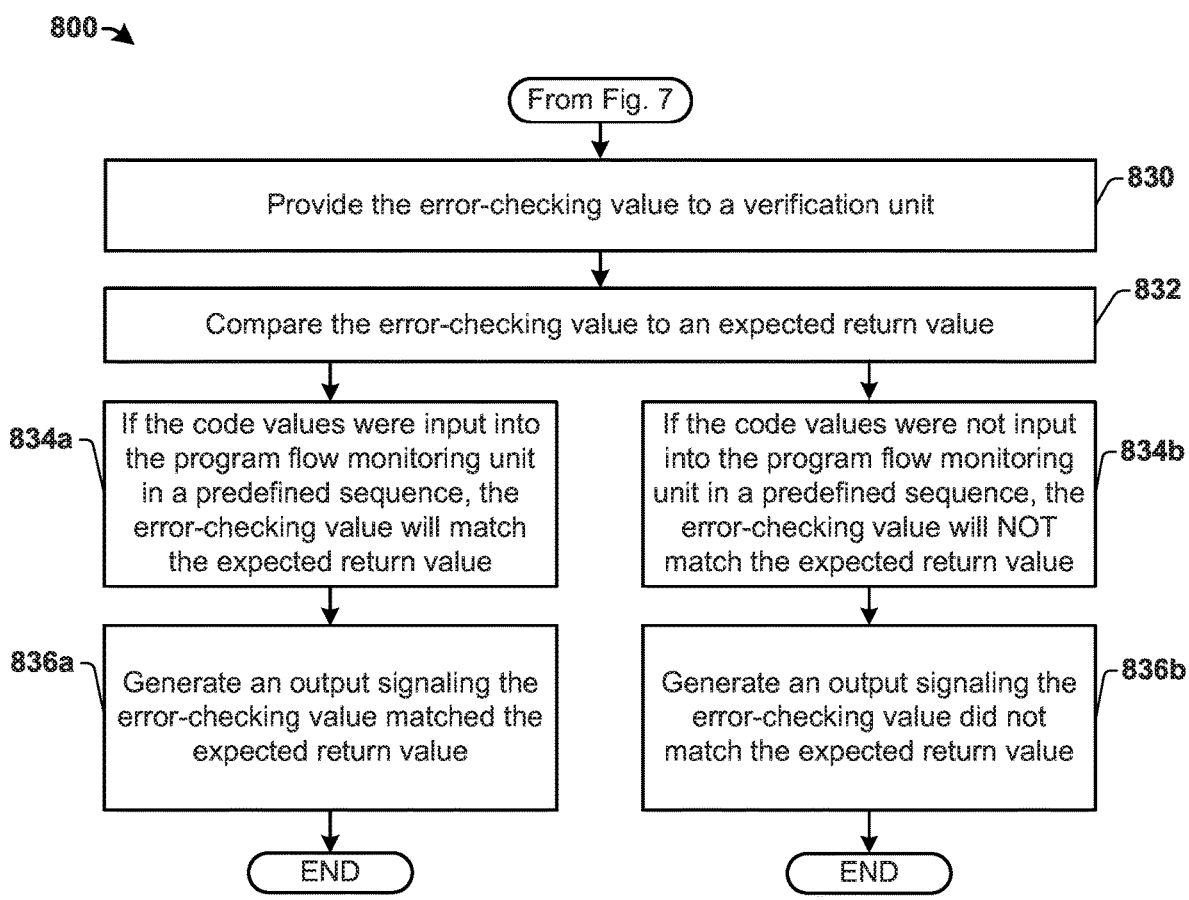
FIG. 8 illustrates a second part of a flow diagram, continued from the first part of the flow diagram in FIG. 7, of some embodiments of a method for generating an output signal that signals an error-checking value either matched or did not match an expected return value.

FIG. 8 is a second part, continued from the first part of the flow diagram in FIG. 7, of a flow diagram of some embodiments of a method 800 for generating an output signal that signals an error-checking value either matched or did not match an expected return value.

It will be appreciated that while method 800 is illustrated and described below as a series of acts or events, the illustrated ordering of such acts or events are not to be interpreted in a limiting sense. For example, some acts may occur in different orders and/or concurrently with other acts or events apart from those illustrated and/or described herein. In addition, not all illustrated acts or events may be required to implement one or more aspects or embodiments of the disclosure herein. Also, one or more of the acts depicted herein may be carried out in one or more separate acts and/or phases.

At 830, in some embodiments, the error-checking value generated by the PFM unit is provided to a verification unit. The error-checking value is an amalgamation of outputs of the state storing units of the PFM unit. For example, the PFM unit may comprise L state storing units, wherein L is an integer greater than or equal to 1. Therefore, an amalgamation of the outputs of each of the L state storing unit comprises the error-checking value. The verification unit may be, for example, a separate hardware unit or may be, for example, implemented in software, firmware, etc. In some embodiments, the verification unit is implemented through software on the processor. In other embodiments, the verification unit is implemented through software on the controller.

At 832, in some embodiments, the verification unit compares the error-checking value to an expected return value. In some embodiments, the expected return value comprises the same number of bits as the predefined code values that were provided to the PFM unit. For example, the predefined code values may comprise M bits, and the expected return value will comprise M bits. In other embodiments, the expected return value may comprise a different number of bits than the predefined code values. For example, each of the code values may comprise M bits (e.g., 32 bits) and the error checking value may comprise L bits (e.g., 16 bits), where M and L are different.

In some embodiments, after the error-checking value is compared to an expected return value 832, one of two possibilities may occur.

The first possibility, as illustrated in 834a, is the error-checking value matching the expected return value. The error-checking value will match the expected return value only if the code values were input into the PFM unit in a predefined sequence. If the error-checking value matches the expected return value, there is a high likelihood the series of instructions were executed in the predefined sequence.

If the error-checking value matches the expected return value 834a, the verification until may generate an output that signals the error-checking value matched the expected return value 836a. For example, in some embodiments, the verification unit provides the controller with the error-checking value. Because the error-checking value is based on the input of the first code value and the second code value, the first code value and second code value can be predefined in such a manner, for example, pseudo-random number generation, to generate an error-checking value that the controller is expected to receive only if no deviation in the execution of the series of instructions occurred. The controller may take appropriate action based on receiving the error-checking value that is identical to the value the controller is expected to receive once execution of the series of instructions is completed. For example, the controller may output a signal to an automotive electronic control unit (ECU) indicating that the series of executions were executed in the predefined sequence.

The second possibility, as illustrated in 834b, is the error-checking value not matching the expected return value. The error-checking value will not match the expected return value if a deviation from the predefined sequence occurred during the input of the code values to the PFM unit. If the error-checking value does not match the expected return value, there is a high likelihood the series of instructions were not executed in the predefined sequence.

If the error-checking value does not match the expected return value 834b, the verification unit may generate an output that signals the error-checking value did not match the expected return value 836b. As noted above, the error-checking value is generated in such a way that it matches the expected return value only if no deviation in the execution of the series of instructions occurred. If the controller receives an error-checking value that is not identical to the expected return value, the controller may take appropriate action based on receiving the error. For example, the controller may take corrective measures and/or warnings may be taken.

What is claimed is:

1. A safety system, comprising:
   a memory circuit configured to store a series of executable instructions, wherein the series of executable instructions is grouped into code parts, and wherein each code part is assigned a code value and each code value is derived independent of the assigned code part;
   a processor circuit configured to execute the series of executable instructions, and to output the code values as the code parts are executed, respectively;
   a program flow monitoring (PFM) unit configured to receive the code values from the processor circuit, such that the PFM unit generates a first PFMU value based on a first of the code values and generates an error-checking value based on the first PFMU value and a second of the code values; and
   a verification unit configured to compare the error-checking value to an expected return value to determine whether the series of executable instructions is executed properly, wherein if the error-checking value does not match the expected return value, the verification unit outputs an electrical signal indicating the series of executable instructions were not executed properly, and wherein the first of the code values and the second of the code values are pseudo-randomly selected, such that the error-checking value matches the expected return value only if the first of the code values and the second of the code values are input into the PFM unit in an expected sequence.

2. The safety system of claim 1, wherein the expected return value is predefined and fixed.

3. The safety system of claim 2, wherein the first of the code values is randomly generated, and wherein the second of the code values is selected such that the error-checking value matches the expected return value only if the first of the code values and the second of the code values are input into the PFM unit in the expected sequence.

4. The safety system of claim 3, wherein the verification unit outputs the electrical signal to a controller, and wherein the controller is integrated on a different integrated circuit (IC) than both the processor circuit and the PFM unit.

5. The safety system of claim 1, wherein the verification unit is configured to further compare a run time of the series of executable instructions to a maximum time interval to determine whether the series of executable instructions is executed properly.

6. The safety system of claim 1, wherein the PFM unit comprises a plurality of state storing units that store the error-checking value, and wherein the processor circuit is configured to reset the plurality of state storing units immediately before executing the series of executable instructions.

7. The safety system of claim 6, wherein both the first of the code values and the second of the code values comprise M bits, wherein the PFM unit comprises at least L stages, and wherein L and M are integers greater than one.

8. The safety system of claim 7, wherein the error-checking value comprises L bits.

9. The safety system of claim 8, wherein:
   the stages are connected in series;
   each bit of the first of the code values is successively input into a first stage of the L stages; and
   after all of the bits of the first of the code values are input into the first stage, each bit of the second of the code values is successively input into the first stage.

10. The safety system to claim 9, wherein the error-checking value is a concatenation of outputs of each of the L stages.

11. The safety system according to claim 1, wherein the PFM unit is configured to generate the error-checking value as a cyclic redundancy check (CRC) on a concatenation of the first of the code values and the second of the code values.

12. A safety system, comprising:
   a hardware monitoring unit configured to perform a first test and a second test on a monitored hardware device;
   a memory circuit configured to store a plurality of series of executable instructions, wherein:
      a first series of executable instructions of the plurality of series of executable instructions comprises a first plurality of code parts and a first plurality of code values that correspond to the first plurality of code parts, respectively; and
      a second series of executable instructions of the plurality of series of executable instructions comprises a second plurality of code parts and a second plurality of code values that correspond to the second plurality of code parts, respectively;
   a processor circuit configured to execute the first series of executable instructions and the second series of executable instructions, wherein:
      executing the first series of executable instructions comprises providing a first plurality of electrical signals based on the first plurality of code parts to the hardware monitoring unit, such that the hardware monitoring unit performs the first test, and wherein the first plurality of code values are output as the first plurality of electrical signals are provided to the hardware monitoring unit, respectively; and
      executing the second series of executable instructions comprises providing a second plurality of electrical signals based on the second plurality of code parts to the hardware monitoring unit, such that the hardware monitoring unit performs the second test, and wherein the second plurality of code values are output as the second plurality of electrical signals are provided to the hardware monitoring unit, respectively;
   a program flow monitoring (PFM) unit configured to receive the first plurality of code values and the second plurality of code values from the processor circuit, such that the PFM unit generates a first error-checking value from the first plurality of code values and a second error-checking value from the second plurality of code values, wherein the second error-checking value is different than the first error-checking value, and wherein both the PFM unit and the processor circuit are discrete from the hardware monitoring unit; and
   a verification unit configured to receive the first error-checking value from the PFM unit, and to compare the first error-checking value to an expected return value to determine whether the processor circuit provided the first plurality of electrical signals to the hardware monitoring unit in a predefined sequence, wherein if the first error-checking value does not match the expected return value, the verification unit outputs an electrical signal indicating the processor circuit did not provide the first plurality of electrical signals to the hardware monitoring unit in the predefined sequence.

13. The safety system of claim 12, further comprising:
an integrated chip comprising the hardware monitoring unit, the memory circuit, the processor circuit, and the PFM unit.

14. The safety system of claim 13, wherein the monitored hardware device comprises a component of an object-detection system, and wherein the monitored hardware unit is discrete from the processor circuit, the PFM unit, and the hardware monitoring unit.

15. The safety system of claim 14, wherein the object-detection system is configured to detect a presence of a physical object that is discrete from the integrated chip.

16. The safety system of claim 12, wherein:
the first plurality of code values are derived independent of the corresponding first plurality of code parts, respectively; and
the second plurality of code values are derived independent of the corresponding second plurality of code parts, respectively.

17. A method for monitoring the flow of a program, comprising:
providing a first electrical signal to an electronic processor unit to trigger the electronic processor to execute a series of executable instructions, wherein the electronic processor is disposed on a first integrated chip and receives the first electrical signal from a controller that is disposed on a second integrated chip different than the first integrated chip, wherein the series of executable instructions comprise a plurality of code parts and a plurality of predefined code values that correspond to the plurality of code parts, respectively, and wherein the plurality of predefined code values are derived independent of the plurality of code parts, respectively;
executing the series of executable instructions on the electronic processor, wherein executing the series of executable instructions comprises providing a plurality of electrical signals based on the plurality of code parts to a hardware monitoring unit, such that the hardware monitoring unit may perform a test on a monitored hardware device;
as the plurality of electrical signals are provided to the hardware monitoring unit, inputting the plurality of predefined code values into a program flow monitoring (PFM) unit, respectively;
generating an error-checking value from the plurality of predefined code values, wherein the error-checking value is generated by the PFM unit, and wherein the error-checking value is based on an order in which the plurality of predefined code values are input into the PFM unit;
comparing the error-checking value to an expected return value to determine whether the series of executable instructions executed properly, wherein the plurality of predefined code values are pseudo-randomly selected, such that the error-checking value matches the expected return value only if the plurality of predefined code values are input into the PFM unit in a predefined sequence;
if the error-checking value does not match the expected return value, determining the series of executable instructions did not execute properly; and
upon determining the series of executable instructions did not execute properly, triggering a warning to indicate the series of executable instructions did not execute properly, wherein the controller triggers the warning via a second electrical signal.

18. The method of claim 17, further comprising:
resetting a plurality of state storing units of the PFM unit immediately before executing the series of executable instructions, wherein the plurality of state storing units store the error-checking value.

19. The method of claim 18, wherein generating the error-checking value comprises:
in response to receiving a first predefined code value of the plurality of predefined code values, generating a first PFMU value and storing the first PFMU value in the plurality of state storing units of the PFM unit; and
in response to receiving a second predefined code value of the plurality of predefined code values, generating a second PFMU value different than the first PFMU value, wherein the second PFMU value is an amalgamation of the first PFMU value and the second predefined code value.

20. The method of claim 17, wherein the expected return value is predefined and fixed.

* * * * *